US009813506B2

(12) United States Patent
Ilan et al.

(10) Patent No.: US 9,813,506 B2
(45) Date of Patent: Nov. 7, 2017

(54) DISTRIBUTED SELF-SERVED APPLICATION REMOTING

(71) Applicant: VMware, Inc., Palo Alto, CA (US)

(72) Inventors: Dan Ilan, Tel Aviv (IL); Tal Zamir, Haifa (IL)

(73) Assignee: VMware, Inc., Palo Alto, CA (US)

(*) Notice: Subject to any disclaimer, the term of this patent is extended or adjusted under 35 U.S.C. 154(b) by 203 days.

(21) Appl. No.: 14/743,545

(22) Filed: Jun. 18, 2015

(65) Prior Publication Data

US 2016/0373532 A1 Dec. 22, 2016

(51) Int. Cl.
| | |
|---|---|
| *H04L 29/08* | (2006.01) |
| *H04L 29/06* | (2006.01) |
| *G06F 9/455* | (2006.01) |
| *G06F 9/44* | (2006.01) |
| *G06F 9/445* | (2006.01) |
| *G06F 9/50* | (2006.01) |

(52) U.S. Cl.
CPC ............ *H04L 67/141* (2013.01); *G06F 9/445* (2013.01); *G06F 9/4445* (2013.01); *G06F 9/45558* (2013.01); *G06F 9/50* (2013.01); *H04L 63/08* (2013.01); *H04L 67/18* (2013.01); *G06F 9/45533* (2013.01); *G06F 2009/45595* (2013.01)

(58) Field of Classification Search
CPC ....... H04L 67/10; H04L 65/403; H04L 67/02; H04L 67/141; H04L 63/08; H04L 67/18; H04L 67/025; G06F 9/4445; G06F 9/445; G06F 9/45558; G06F 9/50; G06F 9/45533; G06F 2009/45595
USPC ....................................................... 709/228
See application file for complete search history.

(56) References Cited

U.S. PATENT DOCUMENTS

| | | | |
|---|---|---|---|
| 6,601,087 B1* | 7/2003 | Zhu ........................ | G06Q 10/10 709/204 |
| 7,418,664 B2* | 8/2008 | Ben-Shachar ......... | G06Q 10/10 709/204 |
| 8,578,004 B1* | 11/2013 | Rohrs .................... | G06Q 30/06 709/220 |
| 9,374,559 B1* | 6/2016 | Beguin .............. | H04N 21/4331 |

(Continued)

OTHER PUBLICATIONS

Michael Muchmore, "How to Set Up Remote Desktop Access," Aug. 2013, PCMag.com, www.pcmag.com/article2/0,2817,2423227,00.asp.*

(Continued)

*Primary Examiner* — Ruolei Zong
(74) *Attorney, Agent, or Firm* — Patterson & Sheridan LLP (57) ABSTRACT

Techniques disclosed herein provide an approach for distributed self-served application remoting. In one embodiment, a user's own computing device, on which a remoted application runs, transmits user interface updates to a destination device which displays the updates and communicates back inputs (e.g., keyboard and mouse inputs) made at the destination device. The user may select an application for remoting by moving the application's window outside the boundaries of a desktop. This is similar to moving the application across computer screens in a multi-monitor setup and may create the illusion of a boundless desktop. In another embodiment, the user may remote the application to multiple destination devices using a "broadcast" mode. In yet another embodiment, the user may remote the application to a virtual machine.

19 Claims, 4 Drawing Sheets

(56) References Cited

U.S. PATENT DOCUMENTS

| | | | |
|---|---|---|---|
| 2004/0024890 A1* | 2/2004 | Baek | H04L 63/10 |
| | | | 709/229 |
| 2013/0054679 A1* | 2/2013 | Jooste | G06F 9/54 |
| | | | 709/203 |
| 2015/0120817 A1* | 4/2015 | Jeong | G06F 3/1454 |
| | | | 709/203 |

OTHER PUBLICATIONS

Jon Fisher, "How to Enable Remote Desktop or RDP in VMware," Nov. 2013, guidingtech.com, www.guidingtech.com/25191/remote-desktop-rdp-vmware/.*

XenApp—Virtual Application Management with Apps On Demand—Citrix, [Retrieved on Jul. 28, 2015]. Retrieved from the Internet: <http://www.citrix.com/products/xenapp/overview.html>.

Overview of RemoteApp, Microsoft Technet [Retrieved on Jul. 28, 2015]. Retrieved from the Internet: <http://technet.microsoft.com/en-us/library/cc755055.aspx>.

Westley, L., "How to enable RemoteApp (via RDP 7.0) within VirtualBox or VMWare running Windows 7, Vista SP1 + or Windows XP SP3", [Retrieved on Jul. 28, 2015]. Retrieved from the Internet: <http://geekswithblogs.net/twickers/archive/2009/12/18/13704 8.aspx>.

Binder, M., "MaxiVista: Enabling An Extra Monitor Over Your Network", Apr. 21, 2010. [Retrieved on Jul. 28, 2015]. Retrieved from the Internet: <http://www.tomshardware.com/reviews/dual-monitor-notebook-maxivista,2608.html>.

Serriere, F., "How-To: Share your keyboard and mouse in realtime with Synergy", Aug. 9, 2005. [Retrieved on Jul. 28, 2015]. Retrieved from the Internet: <http://www.engadget.com/2005/08/09/how-to-share-your-keyboard-and-mouse-in-realtime-with-synergy/>.

Cisco WebEx Web Conferencing, [Retrieved on Jul. 28, 2015]. Retrieved from the Internet: <http://www.webex.com>.

* cited by examiner

DISTRIBUTED SELF-SERVED APPLICATION REMOTING

BACKGROUND

When a user remotely accesses an application configured for mouse-and-keyboard based commands, the user may control a particular server machine remotely from his or her computing device. This type of interaction is commonly referred to as an application "remoting" session. During an application remoting session, the user may interact with an application that is run as a process on the server machine, with its input and output remotely provisioned to the user.

Although traditional application remoting allows applications to be run in servers where the client computing devices have limited hardware capabilities, such application remoting has less to offer where client devices have greater hardware capabilities. In addition, the dedicated server (or servers) running the remoted applications typically provides application remoting to many client devices. As a result, the server can become a bottleneck on a datacenter's network resources and computing power. Moreover, traditional interfaces for application remoting with a dedicated server tend to be cumbersome and to require centralized information technology (IT) control and assistance.

Traditional application remoting allows a server to host a variety of applications which clients access through application remoting, but such application remoting does not permit an application to be shared between client devices. For example, a user who wishes to collaborate with another user on a document accessible via a particular application will need to either send the document to the other user's computing device and ensure that the application is installed in that device, create a remote desktop session that provides a window with the user's entire desktop rather than just the needed application and requires the user to be technically savvy, or set up a meeting (e.g., a WebEx™ meeting) which also requires technical skill and time to set up the meeting.

SUMMARY

One embodiment provides a method for self-served application remoting. The method generally includes receiving a selection of an application running on a first computing device for remoting and a second computing device to send the remoted application to, where the selection is received from a user locally interacting with the first computing device, and where the first computing device is not a dedicated server on which applications are provisioned for remoting purposes. The method further includes establishing a remoting session between the first and the second computing devices and transmitting, by the first computing device, user interface updates of the remoted application to the second computing device. In addition, the method includes receiving, by the first computing device, user inputs made at the second computing device, wherein the user inputs are passed to the remoted application running in the first computing device.

Further embodiments include a computer-readable storage medium storing instructions that when executed by a computer system cause the computer system to perform one or more of the techniques set forth above, and a computer system programmed to carry out one or more of the techniques set forth above.

DETAILED DESCRIPTION

Embodiments presented herein provide an approach for distributed self-served application remoting. In one embodiment, an application remoting session is self-served in that a user's own computing device, on which the remoted application runs, transmits user interface updates to a destination device which displays the user interface updates and sends back user inputs (e.g., keyboard or mouse inputs) made at the destination device. This differs from traditional application remoting, in which applications are run as separate processes on a dedicated server that can become a bottleneck that degrades the remoting experience. The distributed self-served application remoting techniques discussed herein utilize the users' own devices to provide peer-to-peer application sharing that does not create such bottlenecks and allows users to move their applications from device to device, share their work, and collaborate with others.

In one embodiment, the user may select an application for remoting by moving the application's user interface (e.g., a window) outside the boundaries of a desktop. This approach is similar to moving the application across computer screens in a multi-monitor setup, and may create the illusion of a boundless desktop that facilitates collaboration between users who can send applications to each other and work together on the applications. In addition, dragging the user interface outside the boundaries of the desktop is simple and intuitive, in contrast to traditional interfaces for application remoting with a dedicated server, which are unintuitive and may require centralized information technology (IT) control and assistance. An application remoting client (which would also be a server) running in the user's computing device may then present a list of destination computing devices the application can be sent to. The list of destination devices may include, e.g., devices with which remoting sessions have recently been established and nearby devices determined based on known geographic locations or network-hop distances. An application remoting session may then be established with a destination device selected by the user. During the application remoting session, the application remoting client in the source device communicates user interface updates to a similar application remoting client running in the destination device, and in turn the application remoting client running in the destination device sends user inputs (e.g., keyboard and mouse inputs) back to the client running in the source device to be passed to the remoted application. That is, the remoted application's context still runs on the source device, but the application's user interface is moved to the destination device as, e.g., a window. This allows the remoted application to be accessed on the destination device even if the application itself is not installed in the destination device.

In another embodiment, the destination device may be a virtual machine running in a host server. In such a case, the user may drag the application's user interface on top of a user interface for a virtual desktop provided via the virtual machine, and the application remoting client may then send the application to the virtual machine such that the application's user interface is "moved" to the virtual machine, while the application's context still runs in the source device. The opposite case in which the source device is the virtual machine and the destination device is the user's device is also feasible. In such a case, an application remoting client installed on the virtual machine may, when the user drags an application's user interface (e.g., window) outside a user interface for a virtual desktop provided via the virtual machine, communicate the application's user interface updates by default (or as a first option) to the destination device so that the application is hosted on the virtual machine but the application's user interface is "moved" to the user's device that views the virtual machine. Such movement of the application's user interface to the user's device may be useful in bring-your-own-device scenarios where the user wishes to run an application that is only licensed for use inside the corporate environment from the user's own device.

In a further embodiment, the user may select multiple destination devices, and the remoted application may be sent to those devices. Such a "broadcast" mode may be useful in, e.g., a meeting or classroom environment to broadcast the application without using a projector or heavy meeting software. In yet another embodiment, a user may request another application (e.g., select the application from the list) running in source device after the remoting session has been established. In such a case, the user may be required to provide authentication credentials (e.g., a domain password) to access the other application, which would also be remoted to the destination device.

In the following description, numerous specific details are set forth in order to provide a thorough understanding of the present invention. However, it will be apparent to one skilled in the art that the present invention may be practiced without some of these specific details. In other instances, well known process operations and implementation details have not been described in detail in order to avoid unnecessarily obscuring the invention.

Figure 1:
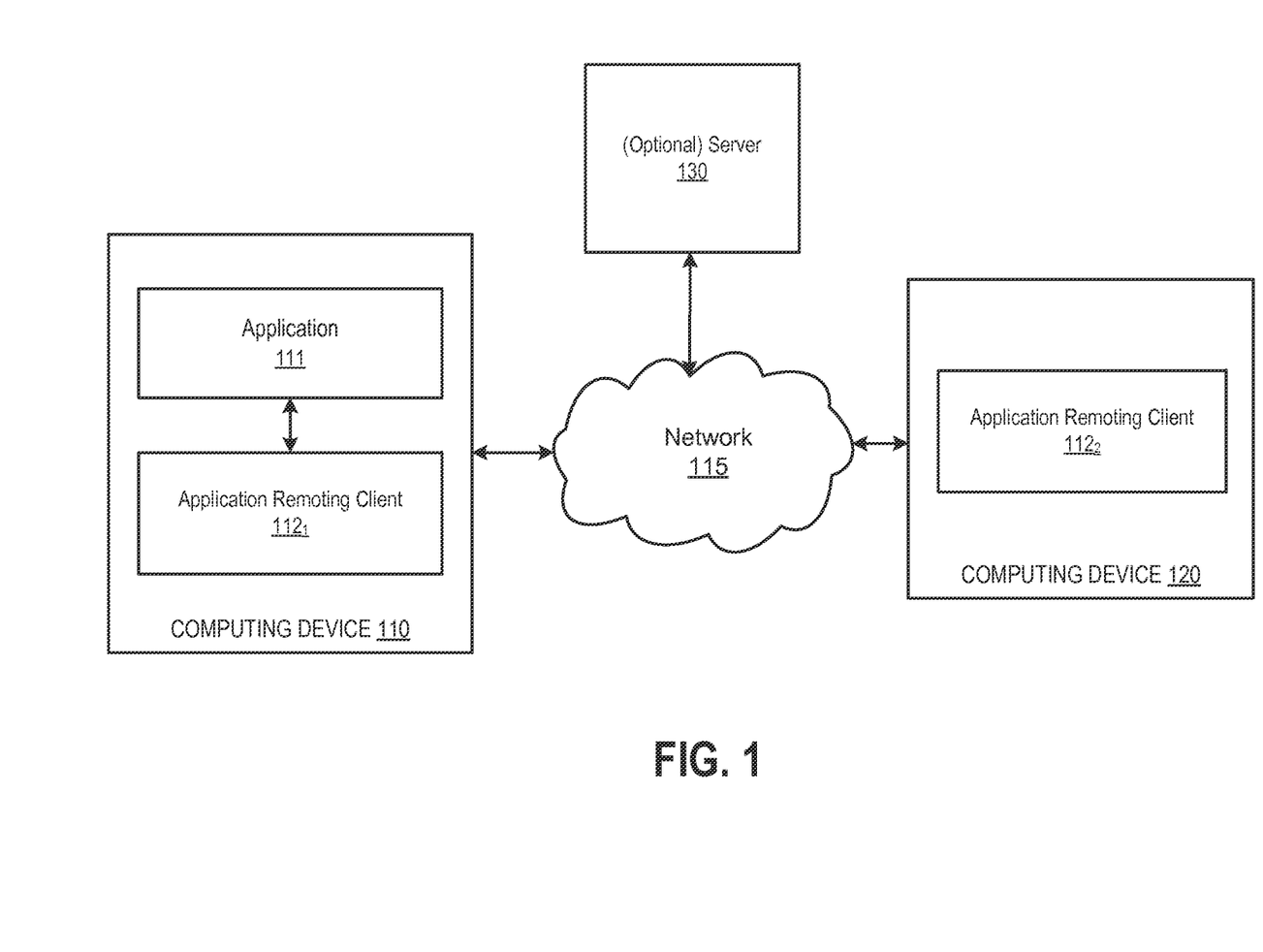
FIG. 1 illustrates an approach for distributed self-served application remoting, according to an embodiment.

FIG. 1 illustrates an approach for distributed self-served application remoting, according to an embodiment. As shown, an example computing device 110 is connected via a network 115 (e.g., a local area network (LAN) or the Internet) to another computing device 120. The computing devices 110, 120 may comprise general purpose computer systems including hardware such as processor(s), memory, disk(s), etc. As shown, an application remoting client 112 executes in each computing device 110, 120. It should be understood that each application remoting client 112 may function as a server or as a client in a self-served application remoting session.

In a self-served application remoting session, application remoting client $112_1$ running in source computing device 110 communicates user interface updates to application remoting client $112_2$ running in destination device 120. In turn, application remoting client $112_2$ issues instructions to a display driver in computing device 120 to display the video output data. Further, input data, such as mouse and/or keyboard input, is collected and processed at destination device 120 by application remoting client $112_2$, and the input data may then be transmitted by application remoting client $112_2$ back to source device 110. After application remoting client $112_1$ receives the input data and passes such data to the remoted application 111, display updates for the remoted application 111 may be received from source device 110 by remoting application client $112_1$ and translated into an appropriate desktop remoting protocol (e.g., the PC-over-IP protocol) that is sent back to application remoting client $112_2$ for display at destination device 120.

A user of computing device 110 may initiate an application remoting session by selecting an application for remoting and a destination computing device to send the application to. For example, a user may wish to work on a document together with someone on another computing device and, in such a case, the user may select an application in which the document is open and send the application to the other user's device. In one embodiment, the user may select the application for remoting by moving the application's user interface (e.g., a window) out of the boundaries of the user's desktop. As discussed, this is similar to the action the user might take to move the application from one computer screen to another in a multi-monitor setup.

After the application is dragged out of the desktop's boundaries, application remoting client $112_1$ presents a user interface that lists other computing devices with which a remoting session may be established. The list of computing devices may include, e.g., devices which are geographically nearby as determined based on network hop distance, network latency, or using a database that stores device locations, devices listed in a directory, and devices with which a remoting session has recently been established. Such a list may be generated by detecting the other devices through broadcast or, alternatively, retrieving the list from an (optional) server 130. An application (not shown) running in a server 130 may maintain a list of devices (and, e.g., their geographic locations) and provide the list to application remoting client $112_1$.

Once the user has selected a destination computing device (assumed for illustrative purposes to be computing device 120) from the list of computing devices, application remoting client $112_1$ establishes a remoting session with application remoting client $112_2$ running in destination device 120, if application remoting client $112_2$ agrees to receive the remoted application 111. After the remoting session is established, the application's 111 user interface is remoted to destination device 120 as, e.g., a window. As discussed, application remoting client $112_1$ may transmit video output data (i.e., the user interface) for the application 111 to application remoting client $112_2$, which collects user input made on the destination device $112_1$ side and sends such input back to application remoting client $112_1$. In turn, application remoting client $112_2$ may pass the input it receives to remoted application 111 and transmit updated application video output data to destination device $112_1$, as appropriate. This process permits the remoted application to be accessed on the destination device even if the application itself is not installed in the destination device.

Although only a single destination computing device 120 is depicted in FIG. 1, it should be understood that in another embodiment, the remoted application 111 may be sent to more than one destination device. As discussed, such a "broadcast" mode may be useful in, e.g., a meeting or classroom environment to permit a single application to be broadcast without needing a projector or heavy meeting software. In yet another embodiment, the destination device may be a virtual machine running in a host server. In such a case, the user may drag the application's 111 user interface on top of a user interface for a virtual desktop provided via the virtual machine, and the virtual desktop infrastructure (VDI) software (e.g., VMware® View client) which provides the virtual machine user interface may detect such a dragging operation and notify application remoting client $112_1$. In turn, application remoting client $112_1$ may send application 111 to the virtual machine such that the application's 111 user interface is "moved" to the virtual machine, while the application's 111 context still runs in source device 110. Similar to the discussion above, this may involve communication of user interface updates from application remoting client $112_1$ to an application remoting client, running in the virtual machine, which communicates user inputs back to application remoting client $112_1$. In a further embodiment, the virtual machine itself may be the source device and the user's device may be the destination device. When a user drags an application's user interface outside a user interface for a virtual desktop provided via the virtual machine, an application remoting client installed on the virtual machine may communicate the application's user interface updates by default (or as a first option) to the destination device so that the application is hosted on the virtual machine but the application's user interface is "moved" to the user's device that views the virtual machine.

Figure 2:
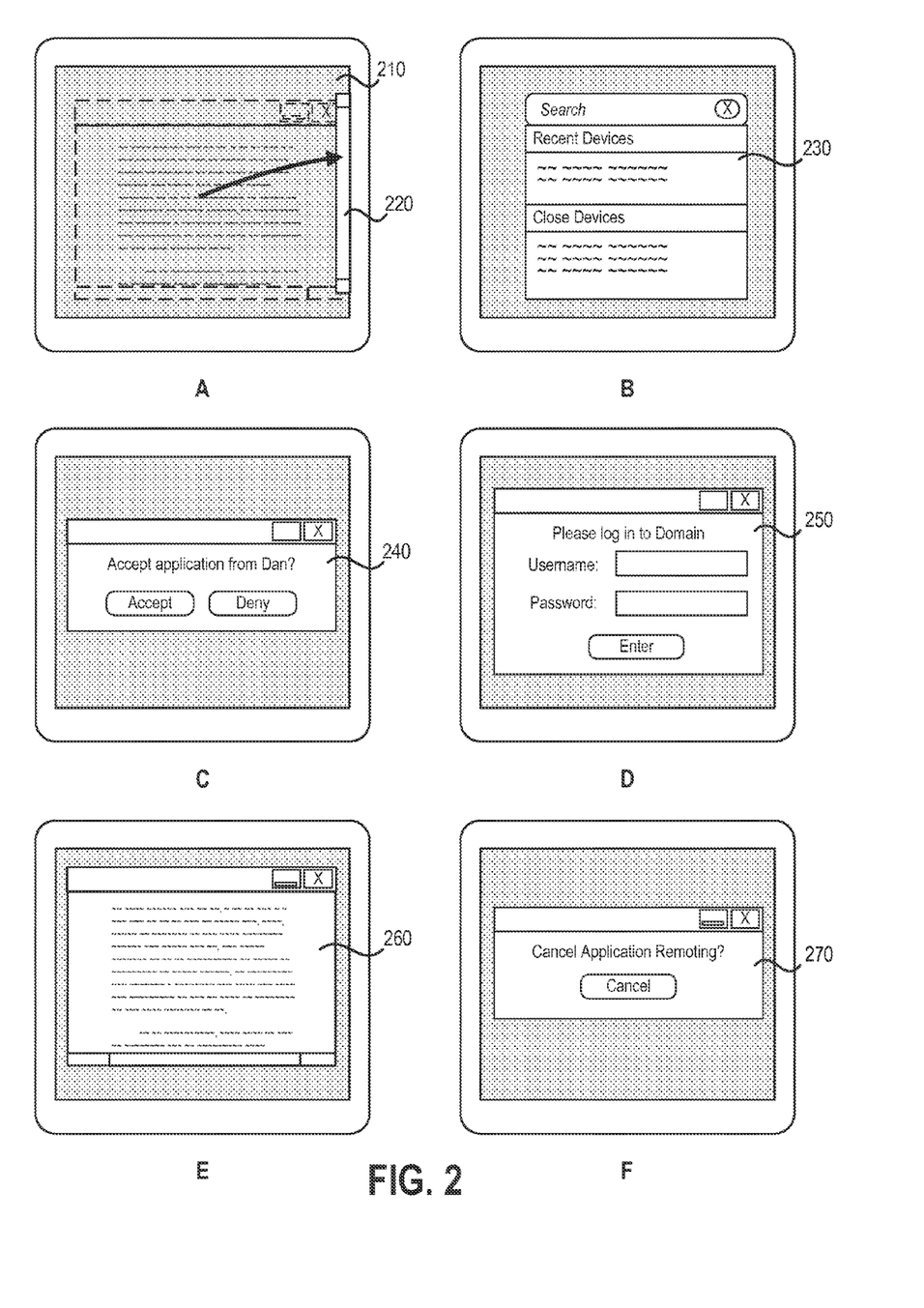
FIG. 2 illustrates example user interfaces in an application remoting session, according to an embodiment.

FIG. 2 illustrates example user interfaces in an application remoting session, according to an embodiment. As shown in panel A, a user who wishes to share an application 111 (e.g., to collaborate with another user on the other user's computing device) may simply drag the application 111 outside boundaries of the user's desktop 220, similar to moving the application 111 from one computer screen to another in a multi-monitor setup. As discussed, this intuitive and streamlined approach is in contrast to traditional interfaces for application remoting with a dedicated server that are cumbersome and often require centralized IT control and assistance.

In response to detecting that application 111 has been moved outside the boundaries of desktop 220, application remoting client $112_1$ presents a pop-up menu 230 of potential destination devices, shown in panel B. Pop-up menu 230 includes a list of other devices with which application remoting sessions have recently been established and nearby devices deduced using, e.g., the number of network hops to the nearby device or known geographic location information. Illustratively, the user is also permitted to search for a destination device using, e.g., an Active Directory search.

Assuming the user selects computing device 120 as the destination device, panels C-D depict user interfaces displayed at destination device 120 for establishing the application remoting session. As shown in panel C, application remoting client $112_2$, running in destination device 120, may present a dialog box 240 notifying a user of destination device 120 that someone wishes to establish an application remoting session and prompting the user to accept or reject the remoting session. Assuming the user accepts the application remoting session, application remoting client $112_2$ may present another, optional, dialog box 250 that prompts the user to enter credentials (e.g., a domain password) required for establishing the application remoting session. Doing so may ensure that an application with sensitive data can only be accessed remotely when the source computing device's 110 user, who initiated the remoting session, is present at destination computing device 120, such as when the source computing device's 110 user is collaborating with a user of destination computing device 120.

Panel E shows a remote version 260 of the application 111 that is displayed at destination device 120 after the remoting session is established. During the remoting session, video output data for the application 111 is transmitted from application remoting client $112_1$ to application remoting client $112_2$, and application remoting client $112_2$ then issues instructions to a display driver in destination device to display the video output data as the remote version 260 of the application. In addition, application remoting client $112_2$ collects inputs made by a user interacting with the remote version 260 of the application at destination device $112_1$ and sends such inputs back to application remoting client $112_1$, which passes the input to remoted application 111. Thereafter, application remoting client $112_1$ then transmits an updated user interface for application 111 to application remoting client $112_2$ for display, as appropriate.

Panel F illustrates a dialog box 270 that is presented at computing device 110 during the application remoting session. As shown, dialog box 270 provides the option of terminating the remoting session, and the user may end the remoting session from computing device 110 by interacting with dialog box 270. Alternatively, the remoting session may be terminated on the destination device 120 side by, e.g., closing the window of the remote version 260 of the application 111.

Figure 3:
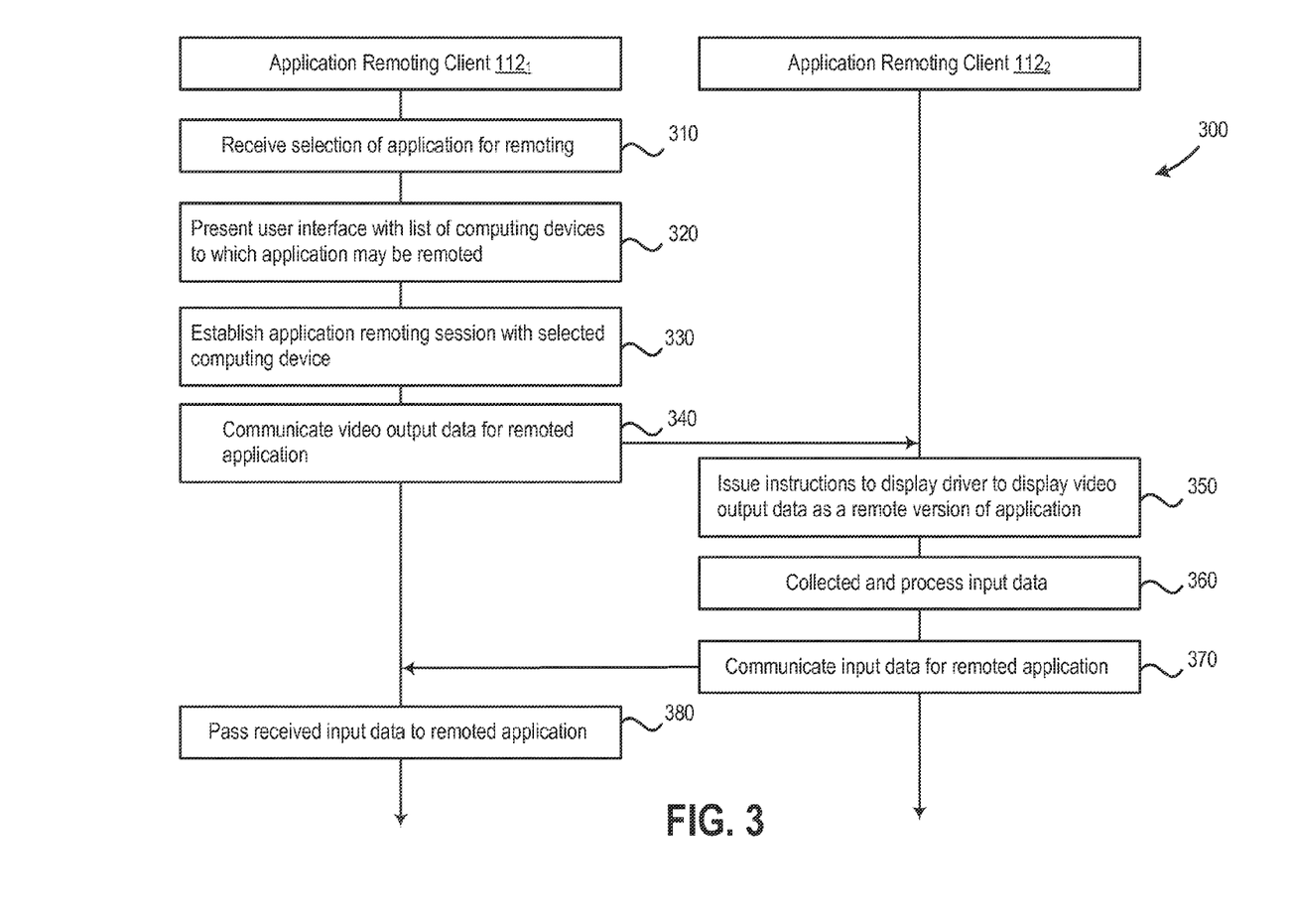
FIG. 3 illustrates a method for providing a self-served application remoting session, according to an embodiment.

FIG. 3 illustrates a method 300 for providing a self-served application remoting session, according to an embodiment. As shown, the method 300 begins at step 310, where application remoting client $112_1$ running in source computing device 110 receives a selection of an application (e.g., application 111) for remoting. In one embodiment, application remoting client $112_1$ may determine that the application has been selected for remoting when a window of the application has been dragged outside the boundaries of a desktop user interface. For example, application remoting client $112_1$ may listen for mouse events and identify that coordinates of the mouse lie outside boundaries of the desktop while the application is being dragged, which indicates that the user has selected the application for remoting. In alternative embodiments, other techniques may be employed to select an application for remoting (e.g., right clicking on the application and choosing a "remote" menu option).

At step 320, application remoting client $112_1$ causes a user interface to be displayed that presents a list of computing devices to which the application may be remoted. In one embodiment, the list of computing devices may include computing devices with which remoting sessions were recently established. The list of computing devices may also include devices which are near computing device 110. Such neighboring devices may be deduced based on, e.g., the number of network hops between computing device 110 and the neighboring devices, the network latency between computing device 110 and the neighboring devices, geographical information indicating the location of computing device 110 and the neighboring devices, and the like. As discussed, the list of computing devices may be generated by detecting the other devices through broadcast or, alternatively, retrieving the list from server 130, which maintains a list of computing devices (and, e.g., their geographic locations). In another embodiment, the user interface may also permit the user to search for a destination device using, e.g., an Active Directory search.

In response to receiving a selection of a destination device (assumed to be computing device 120), application remoting client $112_1$ establishes an application remoting session with the selected computing device at step 330. In one embodiment, an authentication user interface may also be displayed that requires valid credentials (e.g., a domain password) be entered to establish the application remoting session. As discussed, doing so may ensure that the application can only be accessed remotely when the source computing device's user who initiated the remoting session is present at the remote computing device, such as when the user is collaborating with a user of the remoting computing device. In another embodiment, the remoted application 111 may be sent to more than one destination device in a "broadcast" mode. In yet another embodiment, a user may request another application (e.g., select the application from the list) running in source device 110 after the remoting session has been established. As discussed, in such a case, the user may be required to provide authentication credentials (e.g., a domain password) to access the other application, which would also be remoted to destination device 120.

During the remoting session, application remoting client $112_1$ running in source computing device 110 communicates video output data (in particular, user interface updates) to application remoting client $112_2$ running in destination device 120 at step 340. In turn, application remoting client $112_2$ issues instructions to a display driver in computing device 120 to display the video output data as a remote version of the application at step 350. At the same time, the application user interface displayed at the source computing device 110 may be replaced by, e.g., a window through which the user may cancel the remoting session and get the application back.

Input data, such as mouse and/or keyboard input, is collected and processed at step 360 by application remoting client $112_2$. The input data is then be transmitted by application remoting client $112_2$ back to application remoting client $112_1$ at step 370. At step 380, upon receiving the input data, application remoting client $112_1$ passes such data to the remoted application 111. In turn, application remoting client $112_1$ may receive video output updates for the remoted application 111 from source device 110 and translate the updates into an appropriate desktop remoting protocol (e.g., the PC-over-IP protocol) which is sent back to application remoting client $112_2$ for display at destination device 120, similar to steps 340-350, and application remoting client $112_2$ may collect additional inputs that are communicated back to application remoting client $112_1$ similar to steps 360-370. This process may repeat until the remoting session is terminated (not shown), either on the source device 110 side or on the destination device 120 side. In one embodiment, a dialog box (e.g., dialog box 270) may be presented at the source device 110 side, and a user may end the remoting session from source device 110 by interacting with such a dialog box. Alternatively, the remoting session may be terminated on the destination device 120 side by, e.g., closing a window of the remote version of the application that is displayed at the destination device 120.

Figure 4:
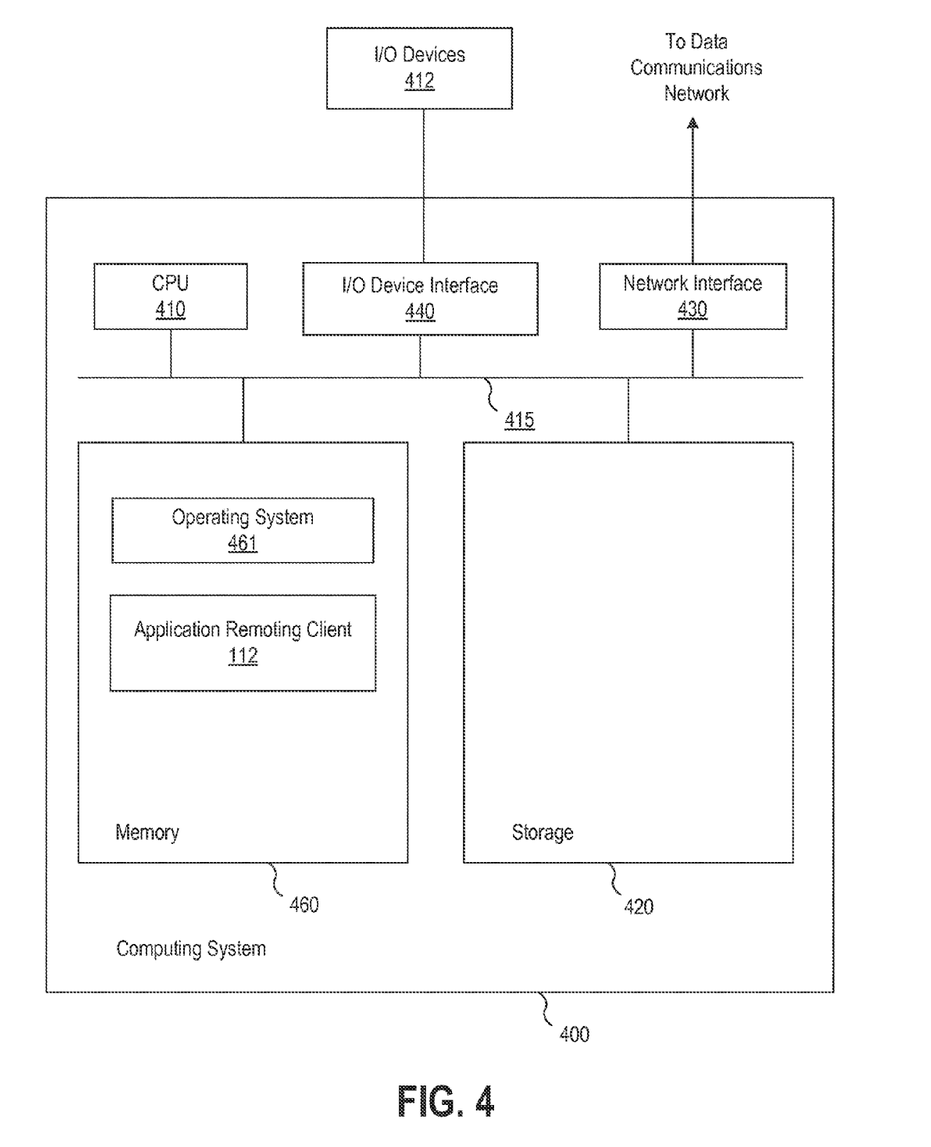
FIG. 4 illustrates a system in which an embodiment may be implemented.

FIG. 4 illustrates a system 400 in which an embodiment may be implemented. As shown, system 400 includes, without limitation, a central processing unit (CPU) 410, a network interface 430, an interconnect 415, a memory 460 and storage 420. System 400 may also include an I/O device interface 440 connecting I/O devices 450 (e.g., keyboard, display and mouse devices) to the system 400.

CPU 410 retrieves and executes programming instructions stored in the memory 460. Similarly, CPU 410 stores and retrieves application data residing in the memory 460. Interconnect 415 facilitates transmission, such as of programming instructions and application data, between CPU 410, I/O device interface 440, storage 420, network interface 430, and memory 460. CPU 410 is included to be representative of a single CPU, multiple CPUs, a single CPU having multiple processing cores, and the like. Memory 460 is generally included to be representative of a random access memory. Storage 420 may be a disk drive storage device. Although shown as a single unit, storage 420 may be a combination of fixed and/or removable storage devices, such as fixed disc drives, floppy disc drives, tape drives, removable memory cards or optical storage, network attached storage (NAS), or a storage area-network (SAN). Further, system 400 is included to be representative of a physical computing system as well as virtual machine instances hosted on a set of underlying physical computing systems. Further still, although shown as a single computing system, one of ordinary skill in the art will recognize that the components of system 400 shown in FIG. 4 may be distributed across multiple computing systems connected by a data communications network.

As shown, memory 460 includes an operating system 461 and application remoting client 112. Operating system 461 may be, e.g., Linux®. Application remoting client 112 is configured to act as either a server or a client in a self-served application remoting session. When acting as the server in an application remoting session, application remoting client 112 may receive a selection of an application for remoting (e.g., by determining that the application's user interface has been dragged outside the boundaries of a desktop user interface), cause a user interface to be displayed that presents a list of computing devices to which the application may be remoted, establish an application remoting session with a selected computing device, receive user inputs made at the second computing device and pass the inputs to the remoted application, and transmit user video output updates of the remoted application to the destination device, according to the method 300 discussed above. When acting as the client in an application remoting session, remoting client 112 may, after the remoting session is established, receive user interface updates for a remoted application from the source device, cause the user interface updates to be displayed to a user, and transmit user inputs made at the destination device back to the source device.

Advantageously, techniques disclosed herein permit an ordinary user's computing device to act as a server for application remoting purposes. Doing so provides peer-to-peer application sharing that does not create the bottlenecks observed in traditional application remoting that rely on a dedicated server running remoted applications. Users can easily move their applications from device to device (even if the destination does not have the application installed), share their work, and collaborate with others in a manner that may be simpler and require less technical skill than sending a file, setting up a remote desktop session, or setting up a meeting. In particular, techniques disclosed herein provide a user interface that permits quick selection of an application for remoting by dragging the application outside boundaries of a desktop. Such a user interface creates the illusion of a boundless desktop and conserves time that would otherwise be spent, e.g., sending and receiving files and managing shared folders or setting up meetings. In a bring-your-own-device environment, techniques disclosed herein also permit the user to easily move an application from a work device to a personal device and interact with a remote version of the application as if the application were native to the remote device.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments, may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless of the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A computer-implemented method for self-served application remoting, comprising:
receiving, by a first computing device, a selection of an application running on the first computing device for remoting;
receiving, by the first computing device, a selection of a second computing device with which a remoting session is to be established, wherein the selection of the second computing device is made by a user locally interacting with the first computing device, and wherein the first computing device is not a dedicated server on which applications are provisioned for remoting purposes;
upon the selection of the second computing device, displaying an authentication screen for authentication of the user on the second computing device, and receiving, by the second computing device, entry of an authentication credential of the user, wherein the entry is made by the user locally interacting with the second computing device;
upon authentication of the user based on the authentication credential, establishing a remoting session between the first and the second computing devices;
transmitting, by the first computing device, user interface updates of the application to the second computing device; and
receiving, by the first computing device, user inputs made at the second computing device, wherein the user inputs received by the first computing device are passed to the application running in the first computing device.

2. The method of claim 1, wherein the user selects the application for remoting by dragging a window of the application outside boundaries of a desktop displayed by the first computing device.

3. The method of claim 1, further comprising,
upon the selection of the application for remoting, displaying, by the first computing device, a list of computing devices including computing devices with which remoting sessions were recently established, wherein the second computing device is selected from the list.

4. The method of claim 1, further comprising, displaying upon the selection of the application for remoting, displaying, by the first computing device, a list of neighboring devices that are determined based on one of a number of network hops between the first computing device and the neighboring devices, a network latency between the first computing device and the neighboring devices, and geographical information indicating the location of the first computing device and the neighboring devices, wherein the second computing device is selected from the list.

5. The method of claim 1, wherein the second computing device is a virtual machine running in a host server.

6. The method of claim 1, further comprising:
establishing a connection between the first computing device and a plurality of other computing devices; and
transmitting, by the first computing device, the user interface updates of the application to the plurality of other computing devices.

7. The method of claim 1, further comprising:
upon the remote session for the application being established, displaying, by the first computing device, a user interface to terminate the remote session; and
upon a user operation to terminate the remote session in the user interface, terminating the remote session by the first computing device.

8. The method of claim 1, further comprising:
upon the remote session for the application being established, displaying, by the second computing device, a user interface of the application; and
upon a user operation to close the user interface of the application, terminating the remote session by the second computing device.

9. A non-transitory computer-readable storage medium embodying computer program instructions for self-served application remoting, the computer program instructions implementing operations comprising:
receiving, by a first computing device, a selection of an application running on the first computing device for remoting;
receiving, by the first computing device, a selection of a second computing device with which a remoting session is to be established, wherein the selection of the second computing device is made by a user locally interacting with the first computing device, and wherein the first computing device is not a dedicated server on which applications are provisioned for remoting purposes;
upon the selection of the second computing device, causing the second computing device to display an authentication screen for authentication of the user, such that an authentication credential of the user can be entered on the authentication screen by the user locally interacting with the second computing device;
upon authentication of the user based on the authentication credential, establishing a remoting session between the first and the second computing devices;
transmitting, by the first computing device, user interface updates of the application to the second computing device; and
receiving, by the first computing device, user inputs made at the second computing device, wherein the user inputs received by the first computing device are passed to the application running in the first computing device.

10. The computer-readable storage medium of claim 9, wherein the user selects the application for remoting by dragging a window of the application outside boundaries of a desktop displayed by the first computing device.

11. The computer-readable storage medium of claim 9, the operations further comprising,
upon the selection of the application for remoting, displaying, by the first computing device, a list of computing devices including computing devices with which remoting sessions were recently established, wherein the second computing device is selected from the list.

12. The computer-readable storage medium of claim 9, the operations further comprising,
upon the selection of the application for remoting, displaying, by the first computing device, a list of neighboring devices that are determined based on one of a number of network hops between the first computing device and the neighboring devices, a network latency between the first computing device and the neighboring devices, and geographical information indicating the location of the first computing device and the neighboring devices, wherein the second computing device is selected from the list.

13. The computer-readable storage medium of claim 9, wherein the second computing device is a virtual machine running in a host server.

14. The computer-readable storage medium of claim 9, the operations further comprising:
establishing a connection between the first computing device and a plurality of other computing devices; and
transmitting, by the first computing device, the user interface updates of the application to the plurality of other computing devices.

15. A system, comprising:
a processor; and
a memory, wherein the memory includes a program, the program being configured to perform operations for self-served application remoting, the operations comprising:
receiving, by the processor, a selection of an application running on the system for remoting,
receiving, by the processor, a selection of a computing device with which a remoting session is to be established, wherein the selection of the computing device is made by a user locally interacting with the system, and wherein the system is not a dedicated server on which applications are provisioned for remoting purposes,
upon the selection of the second computing device, causing the computing device to display an authentication screen for authentication of the user, such that an authentication credential of the user can be entered on the authentication screen by the user locally interacting with the computing device,
upon authentication of the user based on the authentication credential, establishing a remoting session between the system and the computing device,
transmitting, by the processor, user interface updates of the application to the computing device, and
receiving, by the processor, user inputs made at the computing device, wherein the user inputs received by the system are passed to the application running in the system.

16. The system of claim 15, wherein the user selects the application for remoting by dragging a window of the application outside boundaries of a desktop displayed by the system.

17. The system of claim 15, the operations further comprising,
upon the selection of the application for remoting, displaying, by the processor, a list of computing devices including computing devices with which remoting sessions were recently established, wherein the computing device with which the remote session is established is selected from the list.

18. The system of claim 15, the operations further comprising,
upon the selection of the application for remoting, displaying, by the first computing device, a list of neighboring devices that are determined based on one of a number of network hops between the first computing device and the neighboring devices, a latency between the first computing device and the neighboring devices, and geographical information indicating the location of the first computing device and the neighboring devices, wherein the computing device with which the remote session is established is selected from the list.

19. The system of claim 15, the operations further comprising:
 establishing a connection between the system and a plurality of other computing devices; and
 transmitting, by the processor, the user interface updates of the application to the plurality of other computing devices.

* * * * *